US012710785B2

(12) United States Patent
Machnikowski et al.

(10) Patent No.: US 12,710,785 B2
(45) Date of Patent: Aug. 18, 2026

(54) FASTEST CLOCK SYNCHRONIZATION ALGORITHM

(71) Applicant: MELLANOX TECHNOLOGIES, LTD., Yokneam (IL)

(72) Inventors: Maciej Machnikowski, Reda (PL); Thomas Kernen, Russin (CH); Nir Laufer, Zoran (IL); Wojciech Waśko, Młynek (PL); Dotan David Levi, Kiryat Motzkin (IL); Bar Or Shapira, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 228 days.

(21) Appl. No.: 18/438,663

(22) Filed: Feb. 12, 2024

(65) Prior Publication Data

US 2025/0258519 A1 Aug. 14, 2025

(51) Int. Cl.
*G06F 1/08* (2006.01)
*G06F 1/12* (2006.01)

(52) U.S. Cl.
CPC . *G06F 1/12* (2013.01); *G06F 1/08* (2013.01)

(58) Field of Classification Search
CPC .................................... G06F 1/12; G06F 1/08
See application file for complete search history.

(56) References Cited

U.S. PATENT DOCUMENTS

2012/0023262 A1* 1/2012 Berke ..................... G06F 1/324
709/248
2018/0232006 A1* 8/2018 Ganfield ............... H04L 7/0037
2018/0309565 A1* 10/2018 Paterson ............. H04L 43/0852
2019/0294204 A1* 9/2019 Castro ....................... G06F 1/06
2020/0097039 A1* 3/2020 Mautner ............... G06F 13/122
2020/0097041 A1* 3/2020 Mautner ................... G06F 1/12
2020/0099382 A1* 3/2020 Mautner ............... G06F 13/122

* cited by examiner

*Primary Examiner* — Zahid Choudhury
(74) *Attorney, Agent, or Firm* — Sheridan Ross P.C.

(57) ABSTRACT

Embodiments of the present disclosure are directed to synchronizing clocks across a plurality of computing devices. Generally speaking, the clocks of the plurality of devices can be synchronized to whichever of the clocks is the furthest ahead in time. More specifically, embodiments provide for determining a common time reference establishment without need for an external reference. Rather, a computing device or node with the furthest ahead in time clock among devices or nodes in a group or time domain can be become the leader node and propagate time to the other nodes. Embodiments of the present disclosure can replace the traditional one-way time transfer from the IEEE 1588 timeTransmitter to the timeReceiver with two-way communication and time transfer.

20 Claims, 5 Drawing Sheets

FASTEST CLOCK SYNCHRONIZATION ALGORITHM

FIELD OF THE DISCLOSURE

The present disclosure is generally directed to maintaining a clock across a plurality of computing devices and more particularly to synchronizing the clocks of the plurality of devices to whichever of the clocks has the highest value, i.e., is the furthest ahead in time.

BACKGROUND

In large data centers, there is an emerging trend toward create a common reference across multiple nodes. Such common references are useful for use cases such as, but not limited to, traffic shaping, short-lived key exchange, and so on. Current solutions assume that there is an external time source, usually in form of a Global Navigation Satellite System (GNSS) receiver with a one Pulse Per Second (1PPS) output. Deployment of such time sources is problematic inside large data centers and is generally not required for many use cases that only need to agree on a common reference, such as time-based traffic management. Additionally, applications that require a shared timescale often require that the time on that timescale only moves forward, i.e., time can't go back.

Use of arbitrary time scale currently requires either dedicating a single Grandmaster node, or creating a mesh of synchronized grandmasters. Hence, there is a need in the art for improved methods and systems for synchronizing a clock across a plurality of computing devices.

BRIEF SUMMARY

Embodiments of the present disclosure are directed to synchronizing clocks across a plurality of computing devices. Generally speaking, the clocks of the plurality of devices can be synchronized to whichever of the clocks has the highest value, i.e., is furthest ahead in time. More specifically, embodiments provide for determining a common time reference establishment without a need for an external reference. Rather, a computing device or node with the furthest ahead in time clock among devices or nodes in a group or time domain can become the leader node and propagate time to other nodes. Embodiments of the present disclosure can replace the traditional one-way time transfer from the IEEE 1588 timeTransmitter to the timeReceiver with two-way communication and time transfer.

According to one embodiment, a first device of a plurality of devices in a time domain can comprise of a communications interface coupled with a communications network and a control circuit coupled with the communications interface and controlling operations of the first device. The control circuit of the first device can cause the first device to maintain a clock indicating a current time for the first device, send, via the communications interface, to a second device of the plurality of devices, an electronic message comprising a timestamp indicating the current time for the first device, receive, via the communications interface, from the second device, an electronic message comprising a timestamp indicating a current time for the second device based on a clock of the second device, and determine, based on the timestamp of the received electronic message from the second device, which of the clock of the first device and the clock of the second device is furthest ahead in time. The control circuit of the first device can then cause the first device to set the current time for the first device based on the determined furthest ahead in time of the clock of the first device and the clock of the second device.

For example, setting the current time for the first device based on the determined furthest ahead in time of the clock of the first device and clock of the second device can comprise setting the current time for the first device to the current time of the second device in response to determining the clock of the second device is faster than the clock of the first device. In another example, setting the current time for the first device based on the determined furthest ahead in time of the clock of the first device and clock of the second device can comprise maintaining the current time of the first device based on the clock of the first device in response to determining the clock of the first device is faster than the clock of the second device.

In some cases, determining which of the clock of the first device and the clock of the second device is furthest ahead in time can comprise calculating an offset between the current time for the first device and the current time for the second device and determining, based on the calculated offset, which of the clock of the first device and the clock of the second device is furthest ahead in time. Setting the current time for the first device based on the determined furthest ahead in time of the clock of the first device and clock of the second device can comprise adding a value to the current time for the first device based on the calculated offset between the current time for the first device and the current time for the second device. Additionally, or alternatively, the control circuit of the first device can further cause the first device to send, via the communications interface, to the second device, a delay request message and receive, via the communications interface, from the second device, a delay response message indicating a transit time for the delay request message. Determining which of the clock of the first device and the clock of the second device is furthest ahead in time can then be further based on the delay response message.

According to another embodiment, a data center can comprise a communications network and a first device coupled with the communications network and comprising a control circuit controlling operation of the first device. The data center can further comprise a second device coupled with the communication network and comprising a control circuit controlling operation of the second device. The control circuit of the first device can cause the first device to send a first electronic message to the second device via the communications network. The first electronic message can comprise a timestamp indicating a current time for the first device.

The control circuit of the second device can cause the second device to receive the first electronic message from the first device and send a second electronic message to the first device via the communications network. The second electronic message can comprise a timestamp indicating a current time for the second device.

The control circuit of the first device can cause the first device to receive the second electronic message from the second device, determine, based on the timestamp of the received second electronic message, which of the clock of the first device and the clock of the second device is furthest ahead in time, and set the current time for the first device based on the determined furthest ahead in time of the clock of the first device and clock of the second device. Similarly, the control circuit of the second device can cause the second device to determine, based on the timestamp of the received first electronic message, which of the clock of the first device and the clock of the second device is furthest ahead in time, and set the current time for the second device based on the determined furthest ahead in time of the clock of the first device and clock of the second device.

For example, setting the current time for the first device based on the determined furthest ahead in time of the clock of the first device and clock of the second device can comprise setting the current time for the first device to the current time for the second device in response to the determining the clock of the second device is faster than the clock of the first device and/or maintaining the current time of the first device based on the clock of the first device in response to determining the clock of the first device is faster than the clock of the second device. Determining which of the clock of the first device and the clock of the second device is furthest ahead in time can comprise calculating an offset between the current time for the first device and the current time for the second device and determining, based on the calculated offset, which of the clock of the first device and the clock of the second device is furthest ahead in time. Setting the current time for the first device based on the determined furthest ahead in time of the clock of the first device and clock of the second device can comprise adding a value to the current time for the first device based on the calculated offset between the current time for the first device and the current time for the second device.

In some cases, the control circuit of the first device can further cause the first device to send, via the communications network, to the second device, a delay request message. The control circuit of the second device can cause the second device to receive the delay request message from the first device, determine a transit time for the delay request message, and send, via the communications network, to the first device, a delay response message comprising the determined transit time. The control circuit of the first device can further cause the first device to receive the delay response message. Determining which of the clock of the first device and the clock of the second device is furthest ahead in time can be further based on the delay response message.

According to yet another embodiment, a method for synchronizing clocks between a plurality of computing devices can comprise sending, by a first computing device of the plurality of computing devices, a first electronic message to a second computing device of the plurality of computing devices via a communications network. The first electronic message can comprise a timestamp indicating a current time for the first computing device.

The first electronic message from the first computing device can be received by the second computing device and a second electronic message can be sent, by the second computer device, to the first device via the communications network. The second electronic message can comprise a timestamp indicating a current time for the second device.

The second electronic message can be received by the first computing device from the second device. The first computing device can then determine, based on the timestamp of the received second electronic message, which of the clock of the first computing device and the clock of the second computing device is furthest ahead in time and set the current time for the first computing device based on the determined furthest ahead in time of the clock of the first computing device and clock of the second computing device. Similarly, the second computing device can determine, based on the timestamp of the received first electronic message, which of the clock of the first computing device and the clock of the second computing device is furthest ahead in time and set the current time for the second computing device based on the determined furthest ahead in time of the clock of the first computing device and clock of the second computing device.

For example, setting the current time for the first computing device based on the determined furthest ahead in time of the clock of the first computing device and clock of the second computing device can comprise, setting the current time for the first computing device to the current time for the second computing device in response to the determining the clock of the second computing device is faster than the clock of the first computing device and maintaining the current time of the first computing device based on the clock of the first computing device in response to determining the clock of the first computing device is faster than the clock of the second computing device.

In some cases, the first computing device can send, via the communications network, to the second computing device, a delay request message. The second computing device can receive the delay request message from the first device, determine a transit time for the delay request message, and send, to the first computing device, a delay response message comprising the determined transit time. The first computing device can receive the delay response message and determine which of the clock of the first computing device and the clock of the second computing device is furthest ahead in time is based on the delay response message.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
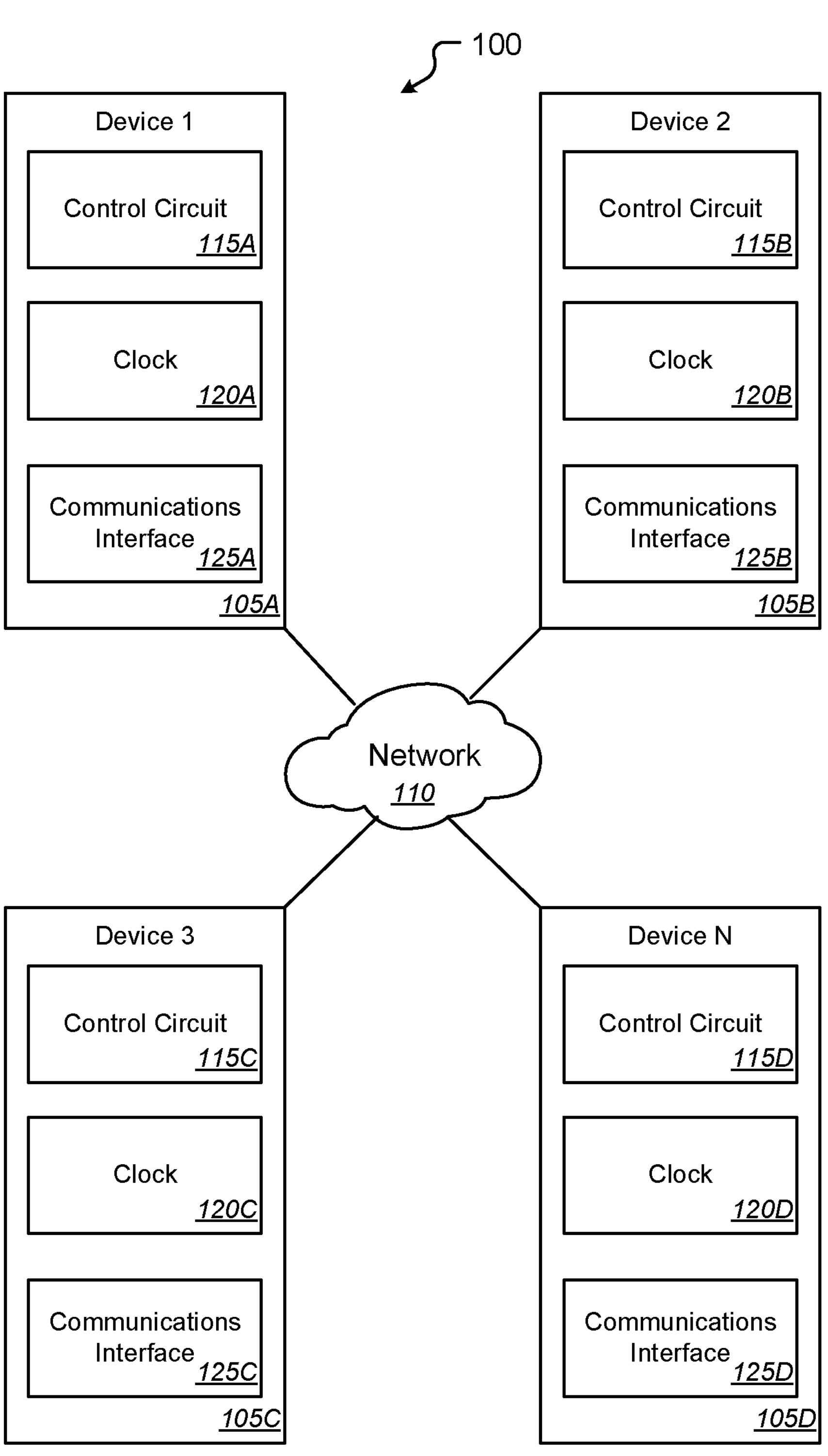
FIG. 1 is a block diagram illustrating an exemplary environment in which embodiments of the present disclosure can be implemented.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases “at least one,” “one or more,” “or,” and “and/or” are open-ended expressions that are both conjunctive and disjunctive in operation. For example, each of the expressions “at least one of A, B and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B and C together.

The term “automatic” and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed “material.”

The terms “determine,” “calculate,” and “compute,” and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms “a,” “an,” and “the” are intended to include the plural forms as well, unless the context clearly indicates otherwise. It will be further understood that the terms “comprise,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof. The term “and/or” includes any and all combinations of one or more of the associated listed items.

Referring now to FIGS. 1-5, various systems and methods for synchronizing clocks across a plurality of computing devices will be described. Generally speaking, the clocks of the plurality of devices can be synchronized to whichever of the clocks has the highest value, i.e., is the furthest ahead in time. More specifically, embodiments provide for determining a common time reference establishment without need for an external reference. Rather, a computing device or node with the furthest ahead in time clock among devices or nodes in a group or time domain can be become the leader node and propagate time to the other nodes. Embodiments of the present disclosure can replace the traditional one-way time transfer from the IEEE 1588 timeTransmitter to the timeReceiver with two-way communication and time transfer.

FIG. 1 is a block diagram illustrating an exemplary environment in which embodiments of the present disclosure can be implemented. As illustrated in this example, the environment 100 can comprise a plurality of computing devices 105A-105D coupled with a communication network 110. The computing devices 105A-105D can each comprise a server or other such device as known in the art. The communications network 110 can comprise any one or more wired and/or wireless local-area and/or wide-area networks as known in the art which can interconnect the computing devices 105A-105D and facilitate electronic communications between the computing devices 105A-105D.

Each computing device 105A-105D can comprise a control circuit 115A-115D controlling operation of the computing device 105A-105D and a communications interface 125A-125D coupling the computing device 105A-105D with the communications network 105. The control circuits 115A-115D can each comprise a Central Processing Unit (CPU), e.g., one or more microprocessors, as known in the art. The communications interfaces 125A-125D can comprise a Network Interface Card (NIC) such as an Ethernet NIC or similar as known in the art.

The control circuit 115A-115D of each device 105A-105D can cause the device to maintain a clock 120A-120D for each device indicating a current time for the computing device 105A-105D.

According to one embodiment, in order to synchronize the clocks 120A-120D across the computing devices 105A-105D, the control circuit 15A of one of the devices, i.e., a first device 115A, can cause the first device 115A to send a first electronic message to another one or more of the computing devices 115B-115D, i.e., a second device 115B, via the communications network 110. The first electronic message can comprise a timestamp indicating a current time for the first device 105A.

The control circuit 115B of the second device 105B can cause the second device 105B to receive the first electronic message from the first device 105A and send a second electronic message to the first device 105A via the communications network 110. The second electronic message can comprise a timestamp indicating a current time for the second device 105B.

The control circuit 115A of the first device 105A can cause the first device 105A to receive the second electronic message from the second device 105B, determine, based on the timestamp of the received second electronic message, which of the clock 120A of the first device 105A and the clock 120B of the second device 105B is furthest ahead in time, and set the current time for the first device 105A based on the determined furthest ahead in time of the clock 120A of the first device 105A and clock 120B of the second device 120B. Similarly, the control circuit 115B of the second device 105B can cause the second device 105B to determine, based on the timestamp of the received first electronic message, which of the clock 120A of the first device 105A and the clock 120B of the second device 105A is furthest ahead in time, and set the current time for the second device 105B based on the determined furthest ahead in time of the clock 120A of the first device 105A and clock 120B of the second device 105B.

For example, setting the current time for the first device 105A based on the determined furthest ahead in time of the clock 120A of the first device 105A and clock 120B of the second device 105B can comprise setting the current time for the first device 105A to the current time for the second device 105B in response to the determining the 120B clock of the second device 105B is faster than the clock 120A of the first device 105A and/or maintaining the current time of the first device 105A based on the 120A clock of the first device 105A in response to determining the clock 120A of the first device 105A is faster than the clock 120B of the second device 105B. Determining which of the clock 120A of the first device 105A and the clock 120B of the second device 105B is furthest ahead in time can comprise calculating an offset between the current time for the first device 105A and the current time for the second device 105B and determining, based on the calculated offset, which of the clock 120A of the first device 105A and the clock 120B of the second device 105B is furthest ahead in time. Setting the current time for the first device based on the determined furthest ahead in time of the clock of the first device and clock of the second device can comprise adding a value to the current time for the first device based on the calculated offset between the current time for the first device and the current time for the second device.

In some cases, the control circuit 115A of the first device 105A can further cause the first device 105A to send, via the communications network 110 110, to the second device 105B, a delay request message. The control circuit 115B of the second device 105B can cause the second device 105B to receive the delay request message from the first device 105A, determine a transit time for the delay request message, and send, via the communications network 110, to the first device 105A, a delay response message comprising the determined transit time. The control circuit 115A of the first device 105A can further cause the first device 105A to receive the delay response message. Determining which of the clock 120A of the first device 105A and the clock 120B of the second device 105B is furthest ahead in time can be further based on the delay response message.

Figure 2:
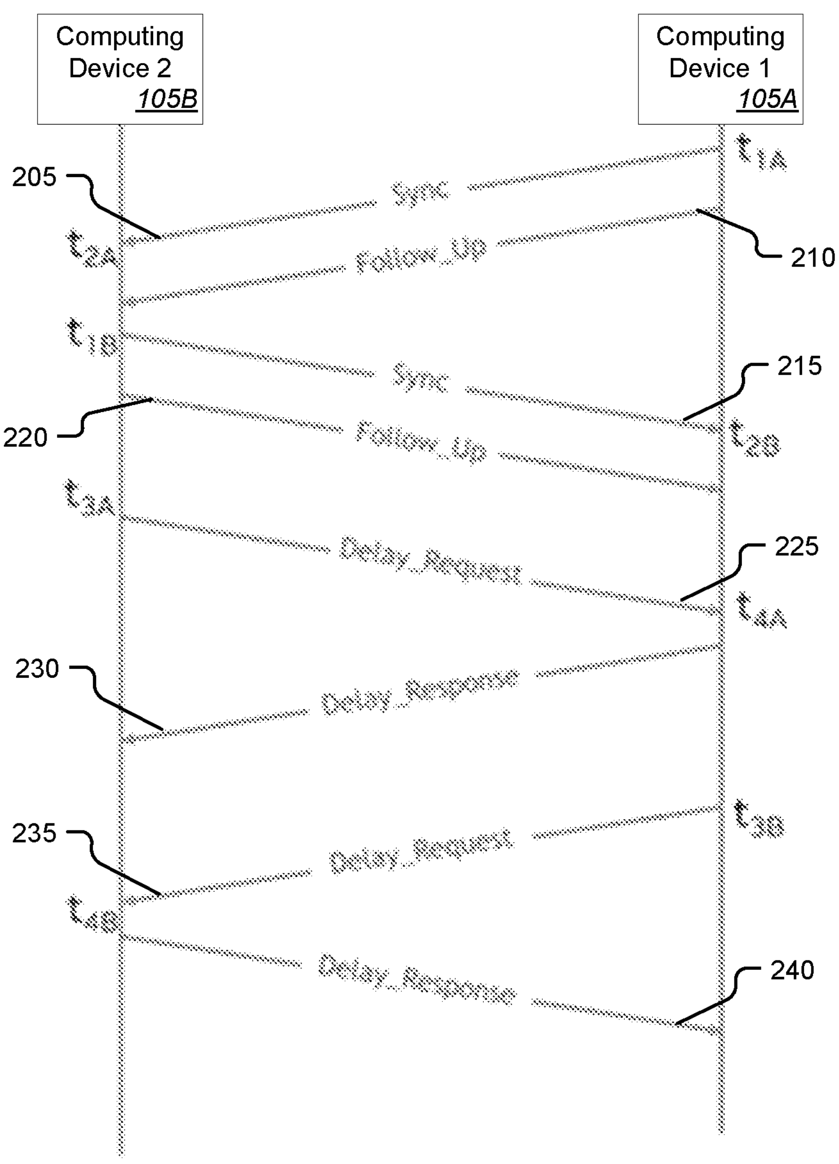
FIG. 2 is a timing diagram illustrating an exemplary exchange between computing devices for synchronizing clocks between the devices according to one embodiment of the present disclosure.

FIG. 2 is a timing diagram illustrating an exemplary exchange between computing devices for synchronizing clocks between the devices according to one embodiment of the present disclosure. According to one embodiment, four timestamps can be generated on each peer node participating in the synchronization. For example, the timestamps can be be generated according to the IEEE 1588 standard. The t1A, t2A, t3A, t4A illustrated in this example timestamps can be used to calculate the relation between the clock 120B of the second computing device 105B to the clock 120A of the first computing device 105A, and t1B, t2B, t3B, t4B timestamps can be used to calculate the relation between the clock 120A of the first computing device 105A to the clock 120B of the second computing device 105B.

As illustrated in this example, the first computing device 105*a* can send an initial "Sync" message 205 to the second computing device 105B. In the case that two-step clocks are utilized under the IEEE 1588 standard, the first computing device 105A can send an optional "Follow_Up" message 210. The second computing device 105B can respond with a "Sync" message 215 and, if used, an optional "Follow_Up" message 220. In some cases, the second computing device 105B may send a "Delay Request" message 225 to which the first computing device 105A can respond with a "Delay Response" message 230 indicating latencies in the message exchanges. Similarly, the first computing device 105A may send a "Delay Request" message 235 to which the second computing device 105B can respond with a "Delay Response" message 235.

Instead of a hierarchical approach proposed by the IEEE 1588, embodiments of the present disclosure can transfer the time in both ways. Both sides of the exchange can then calculate the offset from the other. Based on the timestamps or latency calculations exchanged in these messages, each computing device can adjust its clock to that of the other if the other is faster or maintain its clock without adjustment if it is the faster clock.

Figure 3:
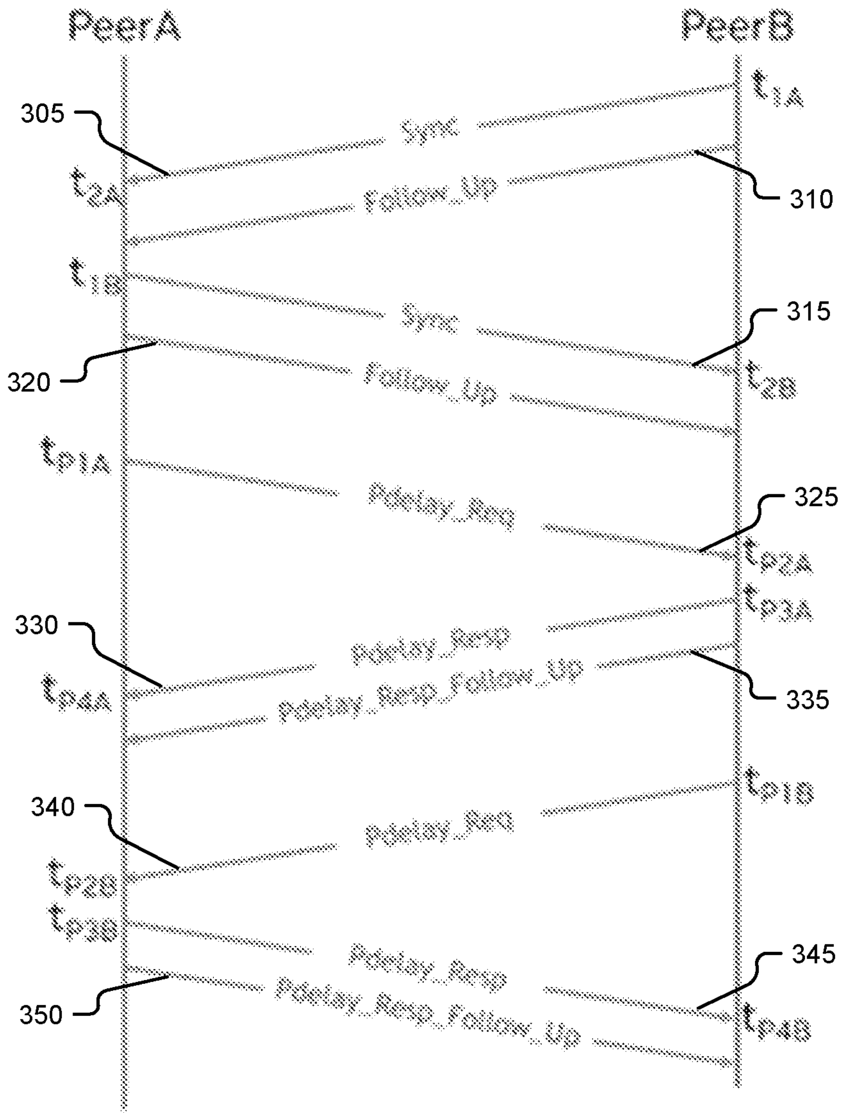
FIG. 3 is a timing diagram illustrating an exemplary exchange between computing devices for synchronizing clocks between the devices according to another embodiment of the present disclosure.

FIG. 3 is a timing diagram illustrating an exemplary exchange between computing devices for synchronizing clocks between the devices according to another embodiment of the present disclosure. As illustrated in this example, six timestamps can be be generated on each computing device participating in the synchronization. For example, the timestamps can be generated according to the IEEE 1588 standard. The $t_{1A}$, $t_{2A}$, $t_{P1A}$, $t_{P2A}$, $t_{P3A}$, $t_{P4A}$, timestamps illustrated here can be used to calculate the relation between the clock 120B of the second computing device 105B to the clock 120A of the first computing device 105A, and $t_{1B}$, $t_{2B}$, $t_{P1B}$, $t_{P2B}$, $t_{P3B}$, $t_{P4B}$, timestamps can be used to calculate the relation between the clock 120A of the first computing device 105A to the clock 120B of the second computing device 105B.

As illustrated in this example, the first computing device 105*a* can send an initial "Sync" message 305 to the second computing device 105B. In the case that two-step clocks are utilized under the IEEE 1588 standard, the first computing device 105A can send an optional "Follow Up" message 310. The second computing device 105B can respond with a "Sync" message 315 and, if used, an optional "Follow_Up" message 320. In some cases, the second computing device 105B may send a "PDelay_Request" message 325 to which the first computing device 105A can respond with a "PDelay_Response" message 330 and optional PDelay_Resp_Follow_Up" message 335 indicating latencies in the message exchanges. Similarly, the first computing device 105A may send a "PDelay_Request" message 340 to which the second computing device 105B can respond with a "PDelay_Response" message 345 and optional PDelay_Resp_Follow_Up" message 350.

Once again, both sides of the exchange can then calculate the offset from the other. Based on the timestamps or latency calculations exchanged in these messages, each computing device can adjust its clock to that of the other if the other is faster or maintain its clock without adjustment if it is the faster clock.

Figure 4:
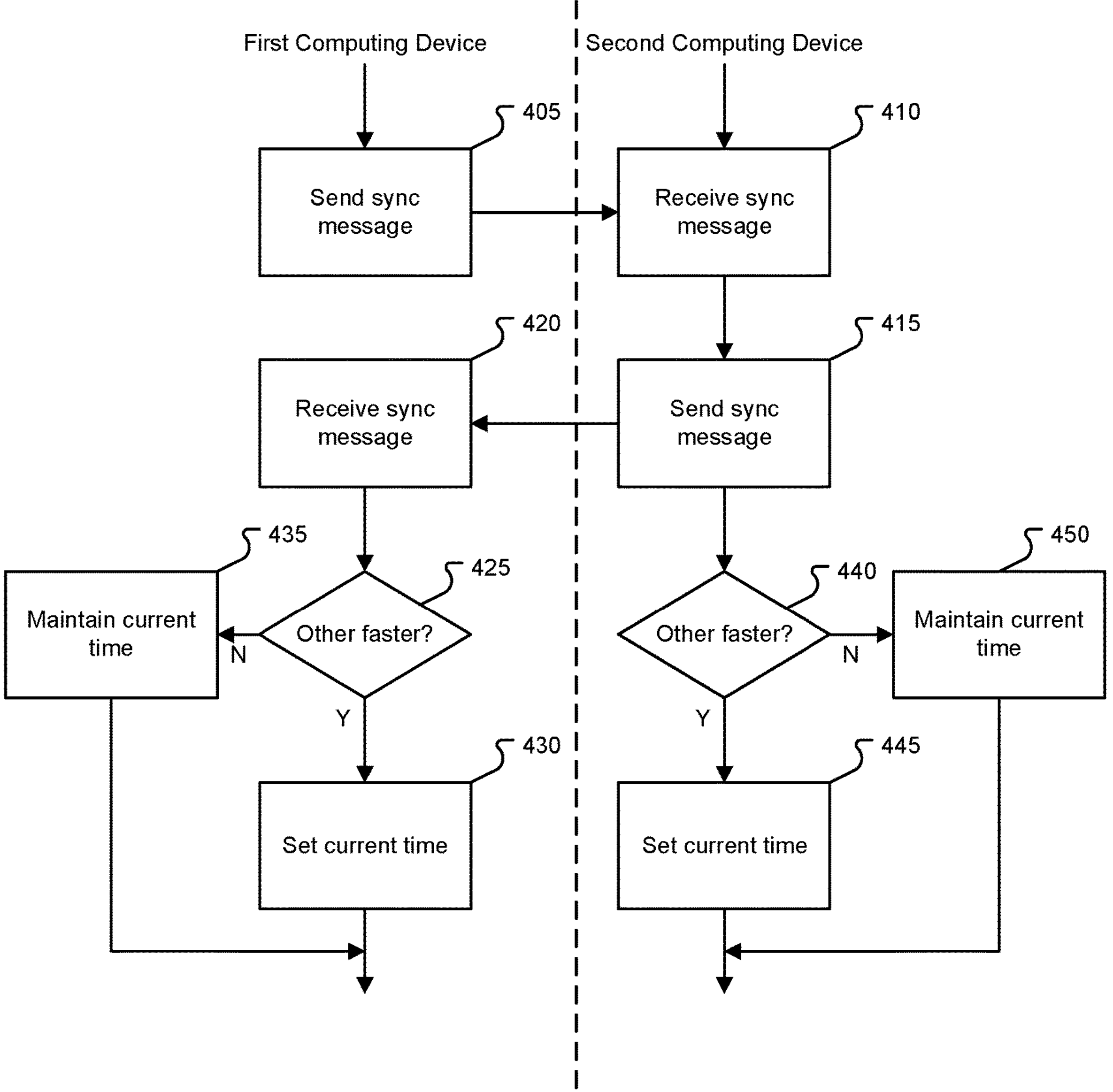
FIG. 4 is a flowchart illustrating an exemplary process for synchronizing clocks between computing devices in a time domain according to one embodiment of the present disclosure.

FIG. 4 is a flowchart illustrating an exemplary process for synchronizing clocks between computing devices in a time domain according to one embodiment of the present disclosure. As illustrated in this example, synchronizing clocks between a plurality of computing devices 105A-105D can comprise sending 405, by a first computing device 105A of the plurality of computing devices, a first electronic message to a second computing device 105B of the plurality of computing devices via a communications network 110. The first electronic message can comprise a timestamp indicating a current time for the first computing device 105A.

The first electronic message from the first computing device 105A can be received 410 by the second computing device 105B and a second electronic message can be sent 415, by the second computing device 105B, to the first computing device 105A via the communications network 110. The second electronic message can comprise a timestamp indicating a current time for the second device 105B.

The second electronic message can be received 420 by the first computing device 105A from the second device 105B. The first computing device 105A can then determine, based on the timestamp of the received second electronic message, which of the clock 120A of the first computing device 105A and the clock 120B of the second computing device 105B is furthest ahead in time and set the current time for the first computing device 105A based on the determined furthest ahead in time of the clock 120A of the first computing device 105A and clock 120B of the second computing device 105B. Similarly, the second computing device 105B can determine, based on the timestamp of the received first electronic message, which of the clock 120A of the first computing device 105A and the clock 120B of the second computing device 105B is furthest ahead in time and set the current time for the second computing device 105B based on the determined furthest ahead in time of the clock 120A of the first computing device 105A and clock 120B of the second computing device 105B.

More specifically, setting the current time for the first computing device 105A based on the determined furthest ahead in time of the clock of the first computing device 105A and clock of the second computing device 105B can comprise making a determination 425 as to whether the clock 120B of the second computing device 105B is faster that the clock 120A of the first computing device 105A. In response to determining 425 that the clock 120B of the second computing device 105 is faster, the first computing device 105A can set 430 its clock 120A to the time indicated by the clock 120B of the second computing device 105B. In response to determining 425 that the clock 120B of the second computing device 105 is not faster, the first computing device 105A can maintain 435 its clock without change.

Similarly, setting the current time for the second computing device 105AB based on the determined furthest ahead in time of the clock 120A of the first computing device 105A and clock 120B of the second computing device 105B can comprise making a determination 440 as to whether the clock 120B of the first computing device 105A is faster that the clock 120B of the second computing device 105B. In response to determining 440 hat the clock 120A of the first computing device 105A is faster, the second computing device 105B can set 445 its clock 120B to the time indicated by the clock 120A of the first computing device 105A. In response to determining 440 that the clock 120A of the first computing device 105A is not faster, the second computing device 105B can maintain 450 its clock without change.

Figure 5:
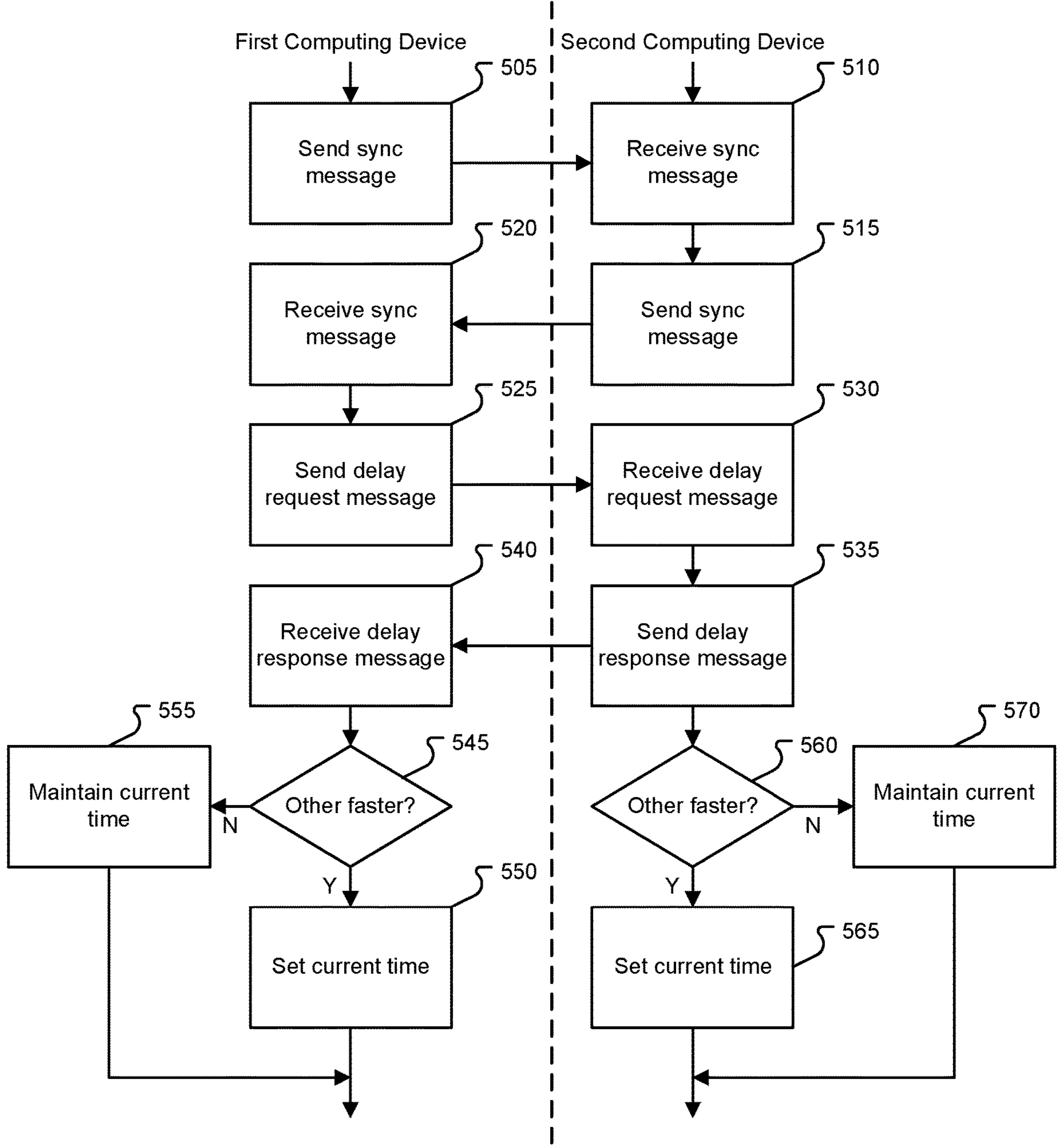
FIG. 5 is a flowchart illustrating an exemplary process for synchronizing clocks between computing devices in a time domain according to another embodiment of the present disclosure.

FIG. 5 is a flowchart illustrating an exemplary process for synchronizing clocks between computing devices in a time domain according to another embodiment of the present disclosure. As illustrated in this example, synchronizing clocks between a plurality of computing devices 105A-105D can comprise sending 505, by a first computing device 105A of the plurality of computing devices, a first electronic message to a second computing device 105B of the plurality of computing devices via a communications network 110. The first electronic message can comprise a timestamp indicating a current time for the first computing device 105A.

The first electronic message from the first computing device 105A can be received 510 by the second computing device 105B and a second electronic message can be sent 515, by the second computing device 105B, to the first computing device 105A via the communications network 110. The second electronic message can comprise a timestamp indicating a current time for the second device 105B.

The second electronic message can be received 520 by the first computing device 105A from the second device 105B. The first computing device 105A can send 525, via the communications network 110, to the second computing device 105B, a delay request message. The second computing device 105B can receive 530 the delay request message from the first computing device 105A, determine a transit time for the delay request message, and send, 535 to the first computing device 105A, a delay response message comprising the determined transit time.

The first computing device 105A can receive 540 the delay response message and can then determine, based on the timestamp of the received second electronic message, which of the clock 120A of the first computing device 105A and the clock 120B of the second computing device 105B is furthest ahead in time and set the current time for the first computing device 105A based on the determined furthest ahead in time of the clock 120A of the first computing device 105A and clock 120B of the second computing device 105B. Similarly, the second computing device 105B can determine, based on the timestamp of the received first electronic message, which of the clock 120A of the first computing device 105A and the clock 120B of the second computing device 105B is furthest ahead in time and set the current time for the second computing device 105B based on the determined furthest ahead in time of the clock 120A of the first computing device 105A and clock 120B of the second computing device 105B.

More specifically, setting the current time for the first computing device 105A based on the determined furthest ahead in time of the clock of the first computing device 105A and clock of the second computing device 105B can comprise making a determination 545 as to whether the clock 120B of the second computing device 105B is faster that the clock 120A of the first computing device 105A. In response to determining 545 that the clock 120B of the second computing device 105 is faster, the first computing device 105A can set 550 its clock 120A to the time indicated by the clock 120B of the second computing device 105B. In response to determining 545 that the clock 120B of the second computing device 105 is not faster, the first computing device 105A can maintain 555 its clock without change.

Similarly, setting the current time for the second computing device 105AB based on the determined furthest ahead in time of the clock 120A of the first computing device 105A and clock 120B of the second computing device 105B can comprise making a determination 560 as to whether the clock 120B of the first computing device 105A is faster that the clock 120B of the second computing device 105B. In response to determining 560 hat the clock 120A of the first computing device 105A is faster, the second computing device 105B can set 565 its clock 120B to the time indicated by the clock 120A of the first computing device 105A. In response to determining 560 that the clock 120A of the first computing device 105A is not faster, the second computing device 105B can maintain 570 its clock without change.

It should be noted that numerous variations in the structure, function, order of operations, and/or other aspects of the various embodiments described herein are contemplated. The operations described above for exemplary processes for synchronizing clocks between computing devices can be performed in different order and each operation need not depend on a prior event or operation. For example, the sending of synchronization messages can be initiated by any device at any time and does not need to happen in response to those events receiving a synchronization message or other event. Also, the process for setting the clock does not need to be executed in response to completing the dialogs. For example, the task of measuring the clock offset can be performed in one process while the task of setting the clock based on the clock offset could be done in the second process that functions asynchronously relative to the first process. Other such variations are further contemplated and are considered to be within the scope of the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A first device of a plurality of devices in a time domain, the device comprising:

a communications interface coupled with a communications network;

a control circuit coupled with the communications interface and controlling operations of the first device, wherein the control circuit of the first device causes the first device to:

maintain a clock indicating a current time for the first device;

send, via the communications interface, to two or more other devices of the plurality of devices, an electronic message comprising a timestamp indicating the current time for the first device;

receive, via the communications interface, from each of the two or more other devices, an electronic message comprising a timestamp indicating a current time for the two or more other devices based on a clock of each of the two or more other devices;

determine, based on the timestamp of the received electronic messages from the two or more other devices, which of the clock of the first device and the clocks of the two or more other devices is furthest ahead in time; and set the current time for the first device based on the determined furthest ahead in time of the clock of the first device and the clocks of the two or more other devices.

2. The device of claim 1, wherein setting the current time for the first device based on the determined furthest ahead in time of the clock of the first device and the clocks of the second device comprises setting the current time for the first device to the current time for one of the two or more other devices in response to the determining the clock of the one of the two or more other devices is faster than the clock of the first device.

3. The device of claim 1, wherein setting the current time for the first device based on the determined furthest ahead in time of the clock of the first device and the clocks of the two or more other devices comprises maintaining the current time of the first device based on the clock of the first device in response to determining the clock of the first device is faster than the clocks of the two or more other devices.

4. The device of claim 1, wherein determining which of the clock of the first device and the clock of the is furthest ahead in time comprises:

calculating an offset between the current time for the first device and the current time for each of the two or more other devices; and determining, based on the calculated offsets, which of the clock of the first device and the clocks of the two or more other devices is furthest ahead in time.

5. The device of claim 4, wherein setting the current time for the first device based on the determined furthest ahead in time of the clock of the first device and clocks of the two or more other devices comprises adding values to the current time for the first device based on the calculated offsets between the current time for the first device and the current time for each of the two or more other devices.

6. The device of claim 1, wherein the control circuit of the first device further causes the first device to:

send, via the communications interface, to each of the two or more other devices, a delay request message; and receive, via the communications interface, from each of the two or more other devices, a delay response message indicating a transit time for the delay request message.

7. The device of claim 6, wherein in determining which of the clock of the first device and the clocks of the two or more other devices is furthest ahead in time is furthest ahead in time is based on the delay response message.

8. A data center comprising:

a communications network;

a first device of a plurality of peer devices coupled with the communications network and comprising a control circuit controlling operation of the first device; and a second device of the plurality of peer devices coupled with the communication network and comprising a control circuit controlling operation of the second device; wherein:

the control circuit of the first device causes the first device to send a first electronic message to the second device via the communications network, the first electronic message comprising a timestamp indicating a current time for the first device;

the control circuit of the second device causes the second device to receive the first electronic message from the first device and send a second electronic message to the first device via the communications network, the second electronic message comprising a timestamp indicating a current time for the second device; and the control circuit of the first device causes the first device to receive the second electronic message from the second device, determine, based on the timestamp of the received second electronic message, which of the clock of the first device and the clock of the second device is furthest ahead in time, and set the current time for the first device based on the determined furthest ahead in time of the clock of the first device and clock of the second device.

9. The data center of claim 8, wherein the control circuit of the second device causes the second device to determine, based on the timestamp of the received first electronic message, which of the clock of the first device and the clock of the second device is furthest ahead in time, and set the current time for the second device based on the determined furthest ahead in time of the clock of the first device and clock of the second device.

10. The data center of claim 8, wherein setting the current time for the first device based on the determined furthest ahead in time of the clock of the first device and clock of the second device comprises, in response to the determining the clock of the second device is faster than the clock of the first device, setting the current time for the first device to the current time for the second device.

11. The data center of claim 8, wherein setting the current time for the first device based on the determined furthest ahead in time of the clock of the first device and clock of the second device comprises, in response to determining the clock of the first device is faster than the clock of the second device, maintaining the current time of the first device based on the clock of the first device.

12. The data center of claim 8, wherein determining which of the clock of the first device and the clock of the second device is furthest ahead in time comprises:

calculating an offset between the current time for the first device and the current time for the second device; and determining, based on the calculated offset, which of the clock of the first device and the clock of the second device is furthest ahead in time.

13. The data center of claim 12, wherein setting the current time for the first device based on the determined furthest ahead in time of the clock of the first device and clock of the second device comprises adding a value to the current time for the first device based on the calculated offset between the current time for the first device and the current time for the second device.

14. The data center of claim 8, wherein:

the control circuit of the first device further causes the first device to send, via the communications network, to the second device, a delay request message;

the control circuit of the second device causes the second device to receive the delay request message from the first device, determine a transit time for the delay request message, and send, via the communications network, to the first device, a delay response message comprising the determined transit time; and the control circuit of the first device further causes the first device to receive the delay response message, wherein in determining which of the clock of the first device and the clock of the second device is furthest ahead in time is further based on the delay response message.

15. A method for synchronizing clocks between a plurality of peer computing devices, the method comprising:

sending, by a first peer computing device of the plurality of peer computing devices, a first electronic message to a second peer computing device of the plurality of peer computing devices via a communications network, the first electronic message comprising a timestamp indicating a current time for the first peer computing device;

receiving, by the second peer computing device, the first electronic message from the first peer computing device;

sending, by the second peer computer device, a second electronic message to the first peer computing device via the communications network, the second electronic message comprising a timestamp indicating a current time for the second peer computing device;

receiving, by the first peer computing device, the second electronic message from the second peer computing device;

determining, by the first peer computing device, based on the timestamp of the received second electronic message, which of the clock of the first peer computing device and the clock of the second peer computing device is furthest ahead in time; and setting, by the first peer computing device, the current time for the first peer computing device based on the determined furthest ahead in time of the clock of the first peer computing device and clock of the second peer computing device.

16. The method of claim 15, further comprising:

determining, by the second peer computing device, based on the timestamp of the received first electronic message, which of the clock of the first peer computing device and the clock of the second peer computing device is furthest ahead in time; and setting, by the second peer computing device, the current time for the second peer computing device based on the determined furthest ahead in time of the clock of the first peer computing device and clock of the second peer computing device.

17. The method of claim 15, wherein setting the current time for the first peer computing device based on the determined furthest ahead in time of the clock of the first peer computing device and clock of the second peer computing device comprises, in response to the determining the clock of the second peer computing device is faster than the clock of the first peer computing device, setting the current time for the first peer computing device to the current time for the second peer computing device.

18. The method of claim 15, wherein setting the current time for the first peer computing device based on the determined furthest ahead in time of the clock of the first peer computing device and clock of the second peer computing device comprises, in response to determining the clock of the first peer computing device is faster than the clock of the second peer computing device, maintaining the current time of the first peer computing device based on the clock of the first peer computing device.

19. The method of claim 15, wherein determining which of the clock of the first peer computing device and the clock of the second peer computing device is furthest ahead in time comprises:

calculating an offset between the current time for the first peer computing device and the current time for the second peer computing device; and determining, based on the calculated offset, which of the clock of the first peer computing device and the clock of the second peer computing device is furthest ahead in time and wherein setting the current time for the first peer computing device based on the determined furthest ahead in time of the clock of the first peer computing device and clock of the second peer computing device comprises adding a value to the current time for the first peer computing device based on the calculated offset between the current time for the first peer computing device and the current time for the second peer computing device.

20. The method of claim 15, further comprising:

sending, by the first peer computing device, via the communications network, to the second peer computing device, a delay request message;

receiving, by the second peer computing device, the delay request message from the first peer computing device;

determining, by the second peer computing device, a transit time for the delay request message;

sending, by the second peer computing device, via the communications network, to the first peer computing device, a delay response message comprising the determined transit time; and receiving, by the first peer computing device, the delay response message, wherein in determining which of the clock of the first peer computing device and the clock of the second peer computing device is furthest ahead in time is further based on the delay response message.

* * * * *